(12) United States Patent
Kikuchi

(10) Patent No.: US 8,130,421 B2
(45) Date of Patent: Mar. 6, 2012

(54) IMAGE READING APPARATUS AND METHOD

(75) Inventor: Akitoshi Kikuchi, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 798 days.

(21) Appl. No.: 12/242,178

(22) Filed: Sep. 30, 2008

(65) Prior Publication Data

US 2009/0086247 A1 Apr. 2, 2009

(30) Foreign Application Priority Data

Oct. 2, 2007 (JP) .................................. 2007-258886

(51) Int. Cl.
*H04N 1/04* (2006.01)

(52) U.S. Cl. ......... 358/461; 358/406; 358/475; 358/482

(58) Field of Classification Search .................. 358/461, 358/406, 475, 482, 483, 487
See application file for complete search history.

(56) References Cited

U.S. PATENT DOCUMENTS

| 6,055,066 A * | 4/2000 | Kanda ........................... 358/461 |
| 7,031,029 B2 * | 4/2006 | Okamura ....................... 358/461 |
| 7,224,484 B1 * | 5/2007 | Reeves et al. .................. 358/1.9 |

FOREIGN PATENT DOCUMENTS

| JP | 11-069162 | 3/1999 |
| JP | 2004-056588 | 2/2004 |

* cited by examiner

*Primary Examiner* — Houshang Safaipour
(74) *Attorney, Agent, or Firm* — Canon USA Inc. IP Division

(57) ABSTRACT

An image reading apparatus for reading a document by causing an image sensor having a plurality of light receiving pixels to scan the document including an encoder configured to output pulses according to rotation of a motor, a generating unit configured to generate a read synchronizing signal for the image sensor based on the pulses, an obtaining unit configured to obtain first shading data corresponding to at least two data accumulation time points from the image sensor, and a storage unit configured to store the first shading data, wherein a function is generated with second shading data corresponding to a read data accumulation time point and is corrected on the basis of the first shading data.

10 Claims, 9 Drawing Sheets

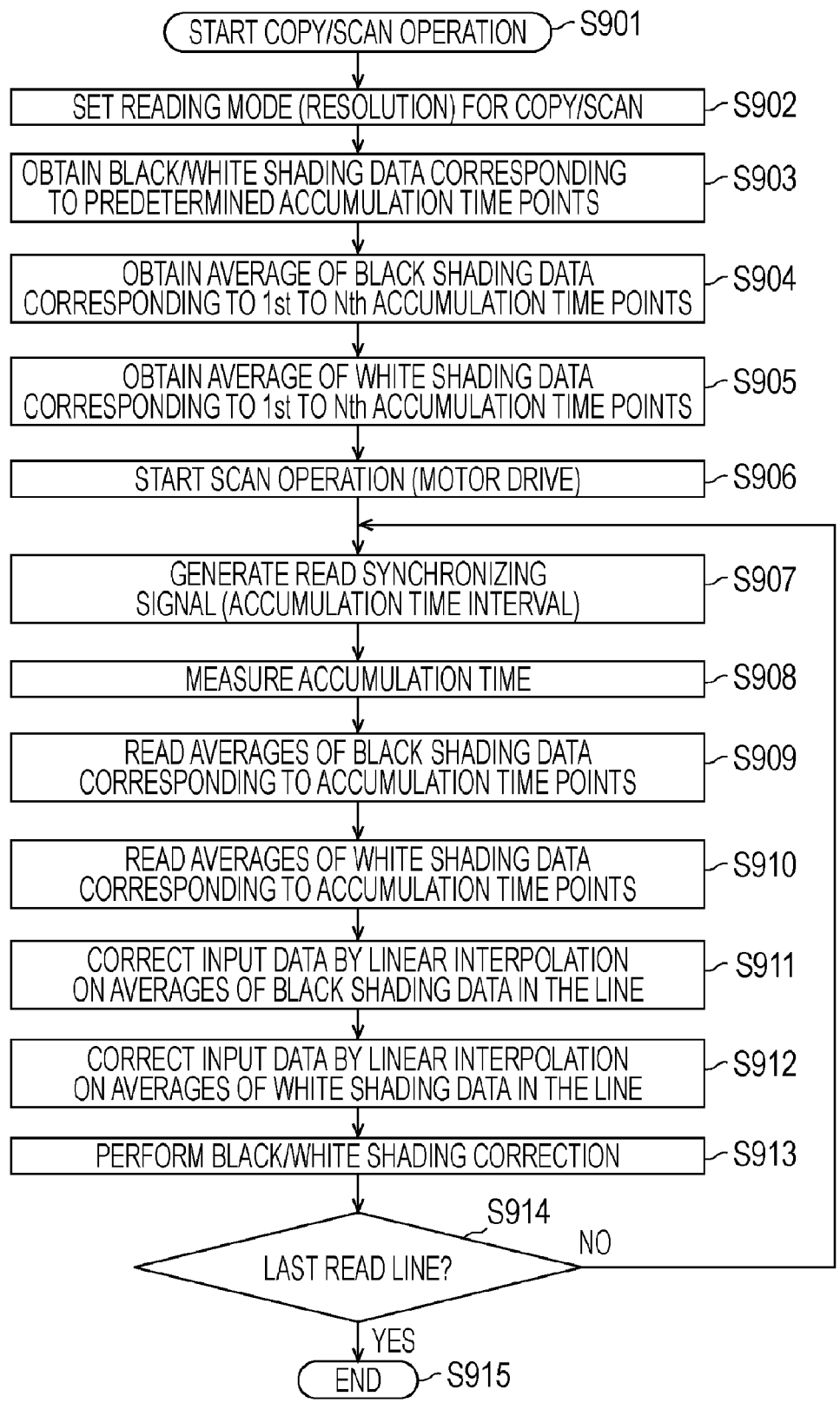

IMAGE READING APPARATUS AND METHOD

BACKGROUND OF THE INVENTION

1. Field of the Invention

The present invention relates to an image reading apparatus and an image reading method in which image data read by a reading device is printed while being subjected to image processing.

2. Description of the Related Art

In recent years, multifunction printers (MFPs) having a copy function and a facsimile (FAX) function, as well as a print function, have come into widespread use. In an MFP, a reading sensor for reading an image of a document is conventionally driven by a stepping motor. An advantage of using a stepping motor is stability at the time of low-speed driving. Another advantage is that there is no need to perform feedback control to pulse-control the motor. At the same time, with the advance of high-quality and high-speed image recording, an image with photographic quality can be copied onto an A4-size sheet within a minute. With the advance of a high-speed copy function, a direct current (DC) motor becomes advantageous in terms of quietness during movement of an image sensor and conveyance of a document.

A DC motor is controlled, for example, with pulses that are output in synchronization with an encoder. In a system which generates a read synchronizing signal corresponding to one line of an image to be read so as to perform a reading operation, feedback control of the motor causes changes in motor speed. Although the amount of speed change varies depending on the speed of driving the motor and the load of driving force on the motor, it is generally known that the amount of speed change increases at the time of low-speed driving. Changes in motor speed cause changes in the period of a read synchronizing signal. To prevent displacement of an image sensor during scanning for reading, it is necessary to separately set the interval of read data accumulation time for the image sensor to accumulate data read using the read synchronizing signal.

When the read data accumulation time changes, a dark current of the image sensor causes changes in black level data output from the image sensor as a result of reading. Changes in read data accumulation time also affect lighting time of a sensor light source, and result in changes in white level data output from the image sensor.

U.S. Pat. No. 6,055,066 discloses an image scanner apparatus which corrects black level data of a charge-coupled device (CCD) sensor (image sensor) according to changes in read data accumulation time of the image sensor. Japanese Patent Laid-Open No. 11-069162 discloses an image reading apparatus which performs a dark output correction on the basis of a dark-output-correction data table corresponding to read data accumulation time of an image sensor.

To perform a black level data correction, the image scanner apparatus disclosed in U.S. Pat. No. 6,055,066 requires two digital-to-analog (D/A) conversion circuits, an analog multiplier circuit, a correction data memory, and a mechanism for passing an accumulation time setting to an D/A conversion circuit. Additionally, since the black level data correction is an analog correction, timing restrictions and adjustment of an analog device are needed. Moreover, since the black level data correction is a line-by-line analog correction, a pixel-by-pixel correction cannot be made.

The image reading apparatus disclosed in Japanese Patent Laid-Open No. 11-069162 selects a gamma ($\gamma$) correction table corresponding to a specified range of accumulation time of the image sensor, so as to perform dark output correction for the image sensor. In this configuration, one of a plurality of $\gamma$ correction tables is selected according to the accumulation time. Therefore, if the accumulation time varies among pixels, the correction cannot be made.

Japanese Patent Laid-Open No. 2004-056588 discloses an apparatus which performs reading in synchronization with the output of an encoder of a DC motor. Since read data accumulation time of a sensor is affected by changes in the speed of the DC motor, the data accumulation time is changed in a non-stepwise manner. The problem of such random changes in accumulation time cannot be solved, even if the output of the sensor is corrected with the techniques disclosed in U.S. Pat. No. 6,055,066 and Japanese Patent Laid-Open No. 11-069162.

SUMMARY OF THE INVENTION

An embodiment of the present invention is for an image reading apparatus in which a reading operation of an image sensor is performed in synchronization with the output of pulses from an encoder of a DC motor. The present invention provides an image reading apparatus that uses linear interpolation to perform a pixel-by-pixel correction of variations in dark current of the image sensor and variations in white level output caused by changes in motor speed.

According to an aspect of the present invention, an image reading apparatus for reading a document by causing an image sensor having a plurality of light receiving pixels to scan the document includes an encoder configured to output pulses according to rotation of a motor, a generating unit configured to generate a read synchronizing signal for the image sensor on the basis of the pulses, an obtaining unit configured to obtain first shading data corresponding to at least two data accumulation time points from the image sensor, and a storage unit configured to store the first shading data. The image reading apparatus generates a function with which second shading data corresponding to a read data accumulation time point is corrected on the basis of the first shading data.

According to another aspect of the present invention, an image reading method for reading a document by allowing a DC motor so as to cause an image sensor having a plurality of light receiving pixels to scan the document includes outputting pulses responsive to rotation of the DC motor; generating a read synchronizing signal on the basis of the pulses; obtaining first shading data corresponding to at least two data accumulation time points from the image sensor; and generating, on the basis of the first shading data, a function for determining second shading data corresponding to an accumulation time point set on the basis of the read synchronizing signal.

As described above, with the present invention, even if the speed of the DC motor changes, a correction of dark current for any accumulation time of the image sensor can be made accurately on a pixel-by-pixel basis.

Further features of the present invention will become apparent from the following description of exemplary embodiments with reference to the attached drawings.

BRIEF DESCRIPTION OF THE DRAWINGS

FIG. 9 is a flowchart illustrating a process of input data correction according to a third embodiment of the present invention.

DESCRIPTION OF THE EMBODIMENTS

Best modes for carrying out the present invention will now be described with reference to the drawings.

First Embodiment

Figure 1:
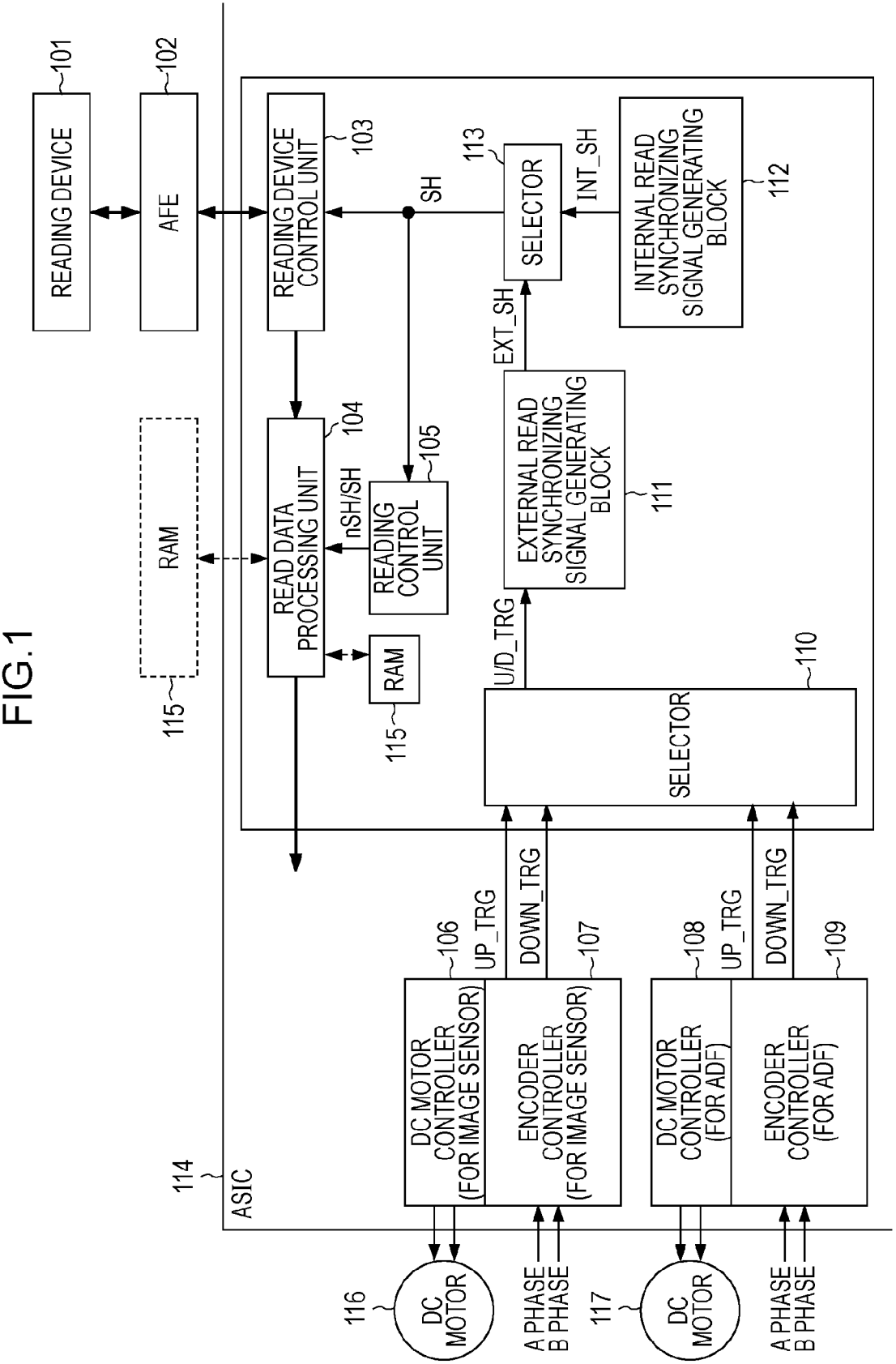
FIG. 1 is a block diagram of an image reading apparatus according to an embodiment of the present invention.

FIG. 1 is a block diagram of an image reading apparatus to which the present invention is applicable.

A reading device 101, such as a CCD sensor or a contact image sensor (CIS), photoelectrically converts light reflected from a document to output an RGB analog signal. The reading device 101 is a linear image sensor having a plurality of light receiving pixels arranged in a line. An analog front end (AFE) device 102 performs analog-to-digital (A/D) conversion on the RGB analog signal to generate a digital signal. A reading device control unit 103 outputs a control signal to the reading device 101 and the AFE device 102. The reading device control unit 103 captures the RGB analog signal from the reading device 101 as a digital signal via the AFE device 102. Then, the reading device control unit 103 transmits image data to a read data processing unit 104 which performs rearrangement and packing of the captured data. Additionally, the reading device control unit 103 performs lighting control of a sensor light source and feedback pulse-width modulation (PWM) control based on the input image signal.

The read data processing unit 104 measures accumulation time with respect to each line by using a means for measuring a period of an external read synchronizing signal generated, for each line or accumulation time, in synchronization with an output signal from an encoder controller (described below). On the basis of a result of the measurement, pixel-by-pixel or line-by-line linear interpolation is performed in accumulation time. Then, after completion of the linear interpolation, an intended shading correction is performed.

A reading control unit 105 controls the start and end of capturing (reading) of image data. A first DC motor controller 106 is a DC motor controller for the image sensor. A first DC motor 116 is a DC motor for driving the image sensor. The first DC motor controller 106 controls driving of the first DC motor 116. A first encoder controller 107 is an encoder controller for the image sensor. The first encoder controller 107 generates pulses of different phases, A phase or B phase, depending on the rotation of the first DC motor 116. A second DC motor controller 108 is a DC motor controller for an auto document feeder (ADF) (not shown). A second DC motor 117 is a DC motor for driving the ADF. A second encoder controller 109 is an encoder controller for the ADF and performs control similar to that of the first encoder controller 107. That is, the second encoder controller 109 generates pulses of different phases, A phase or B phase, depending on the rotation of the second DC motor 117. Here, a rotary encoder is used as a pulse generating mechanism.

According to the processing performed in the first and second encoder controllers 107 and 109, the first and second DC motor controllers 106 and 108 output, to the respective first and second DC motors 116 and 117, Enable signals and Phase signals having information about speed and a rotation direction. Feedback control of the DC motors is performed according to these output signals. The first DC motor 116 serves as a drive source for causing the image sensor to scan a document on a document plate. The second DC motor 117 serves as a drive source for the ADF (not shown). The ADF is a mechanism for moving a document relative to the image sensor. A selector 110 performs switching of control between the first DC motor 116 and the second DC motor 117. Here, the selector 110 allows selection of motor control for reduction of circuit size. If the first DC motor 116 and the second DC motor 117 share the same DC motor control unit including an encoder controller, the selection may be made externally. In the present embodiment, a forward or reverse phase pulse is selected from encoder pulses and output. No selector may be provided if there is only one DC motor to be controlled.

In response to an external signal serving as a trigger, an external read synchronizing signal generating block 111 which generates a read synchronizing signal counts the number of pulses according to information about forward phase pulses, reverse phase pulses, single-edge sampling, and both-edge sampling. Then, on the basis of the number of pulses counted, the external read synchronizing signal generating block 111 generates a reference external read synchronizing signal corresponding to one or a plurality of lines of reading resolution. An internal read synchronizing signal generating block 112 generates a reference internal read synchronizing signal corresponding to one or a plurality of lines of reading resolution from an internal timer (not shown). The internal read synchronizing signal generating block 112 periodically generates a read synchronizing signal (SH) to remove dark current generated in the image sensor during a non-reading operation.

A selector 113 is in a state in which, except the case where the amount of feed of the image sensor needs to be ensured or the DC motors are controlled at a constant speed, a synchronizing signal to the reading device 101 is variable or is not output The selector 113 has a structure being allowed to switch between a read synchronizing signal generated by an external signal as a trigger and a read synchronizing signal generated by the internal timer.

A random-access memory (RAM) 115 is a memory for storing normal shading data and a plurality of shading data values for pixel-by-pixel correction. The RAM 115 may be, for example, a static random-access memory (SRAM) configured as an internal memory in an application specific integrated circuit (ASIC) 114, or a dynamic random-access memory (DRAM) configured as an external memory.

Figure 2:
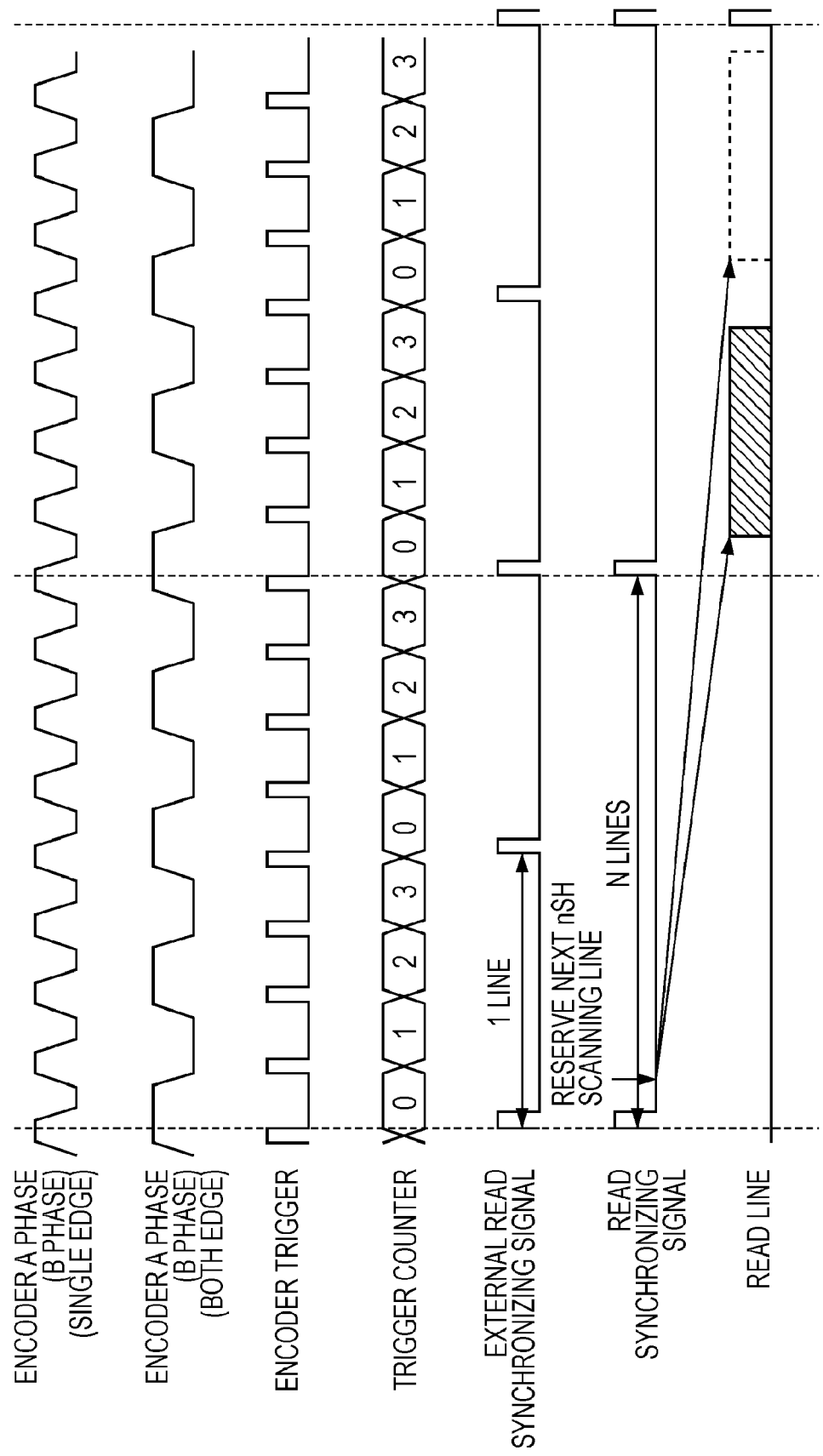
FIG. 2 is a timing diagram illustrating timing at which an image reading apparatus according to an embodiment of the present invention generates a read synchronizing signal.

FIG. 2 is a timing diagram illustrating timing at which an image reading apparatus to which the present invention is applicable generates a read synchronizing signal on the basis of encoder output pulses.

In FIG. 2, "encoder A phase (B phase)" shows an encoder signal output that is input to the first and second encoder controllers 107 and 109 of FIG. 1. For example, when only rising edges of pulses are sampled, the rising edges of pulses are filtered by the encoder controllers to eliminate noise.

Then, the pulses are output as encoder pulses UP/DOWN_TRG. When both edges of pulses are sampled, both the rising and falling edges of pulses are filtered to eliminate noise. Then, the pulses are output as encoder pulses UP/DOWN_TRG. Although FIG. 2 illustrates both single-edge and both-edge sampling in the same diagram, there is no specific correlation therebetween. UP and DOWN of UP/DOWN_TRG represent signals correspond to different rotating directions of a DC motor determined from phase information of the A phase and B phase encoders.

"Trigger counter" (TRG_counter) counts encoder pulses. In the present embodiment, the trigger counter counts encoder pulses UP/DOWN_TRG from 0 to 3 to generate a reference external read synchronizing signal (EXT_SH) corresponding to one line of sub-scanning reading resolution. Additionally, the external read synchronizing signal (EXT_SH) is counted, and an nSH signal corresponding to N lines of sub-scanning reading resolution is generated by the reading control unit (read_ctrl block) 105 of FIG. 1 and output. This is to reduce load of interrupt processing of firmware by generating a synchronizing signal of a plurality of lines and performing interrupt control with firmware. For example, load of interrupt processing of firmware is reduced by controlling read accumulation liens every N lines or performing motor drive control of trigger reservation type every N lines.

In the present embodiment, a sub-scanning direction is referred to as a direction in which the reading device is moved for reading or a direction in which a document to be read is conveyed.

Figure 3:
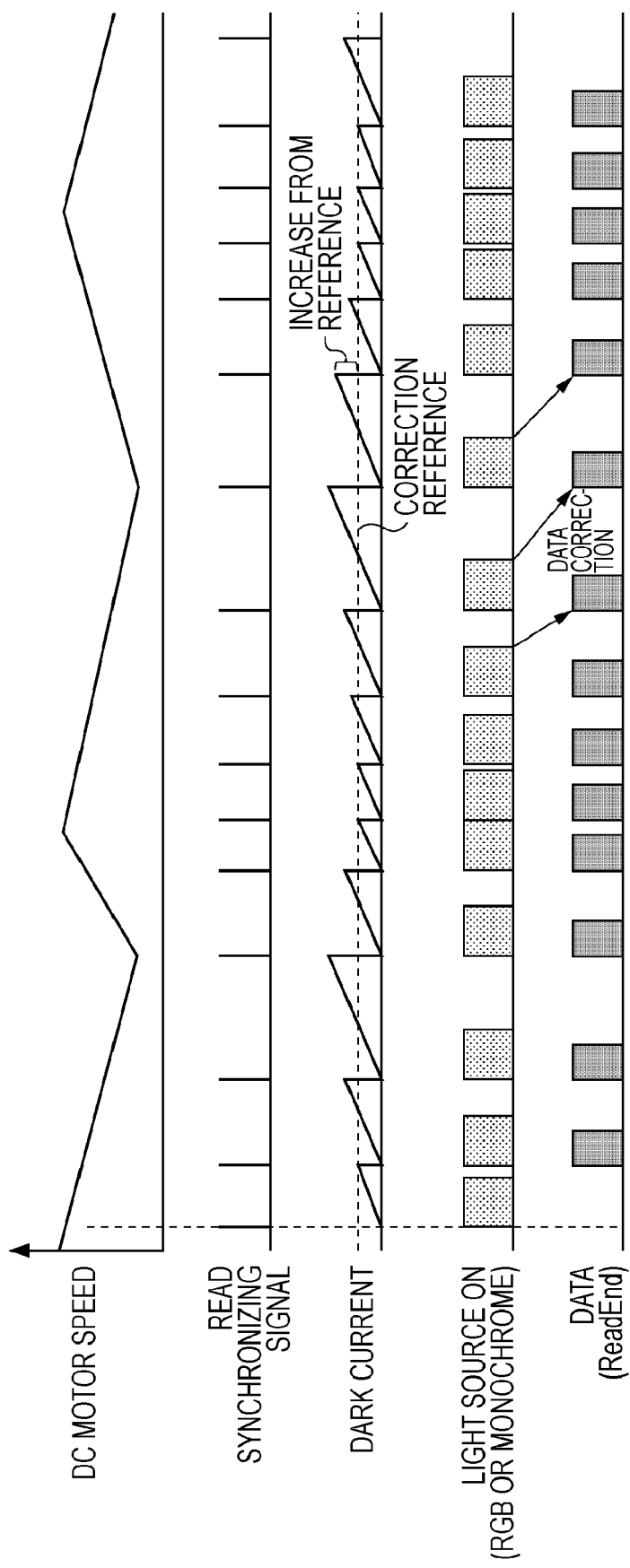
FIG. 3 illustrates a read synchronizing signal and increases in dark current data with respect to changes in motor speed.

FIG. 3 schematically illustrates a read synchronizing signal and increases in dark current data with respect to changes in motor speed, according to the present embodiment.

A motor speed may be changed by servo control of the DC motor. Changes in motor speed cause changes in timing of line-by-line generation of an external read synchronizing signal (SHDIV) generated on the basis of pulses output from the encoder. The higher the motor speed, the shorter the time interval of SHDIV. Conversely, the lower the motor speed, the longer the time interval of SHDIV. When minimum data accumulation time necessary for photoelectric conversion is represented by Typ (=Tmin), the level of dark current at this time point is a correction reference level indicated by a dotted line in FIG. 3. Dark current has a characteristic in that it increases as the accumulation time increases. In FIG. 3, a portion exceeding the correction reference level (indicated by the dotted line) due to an increase in accumulation time represents dark current component data to be corrected. In the example of FIG. 3, lighting time of a light source, which is a light-emitting diode (LED), is constant regardless of the time interval of each SHDIV. In the present embodiment, data accumulated in the image sensor by lighting-up of the light source in one read synchronizing signal period is corrected at the next synchronization timing of lighting-up of the light source. The data correction is performed while accumulated data is being reflected in correction shading data for use in correction.

Figure 4:
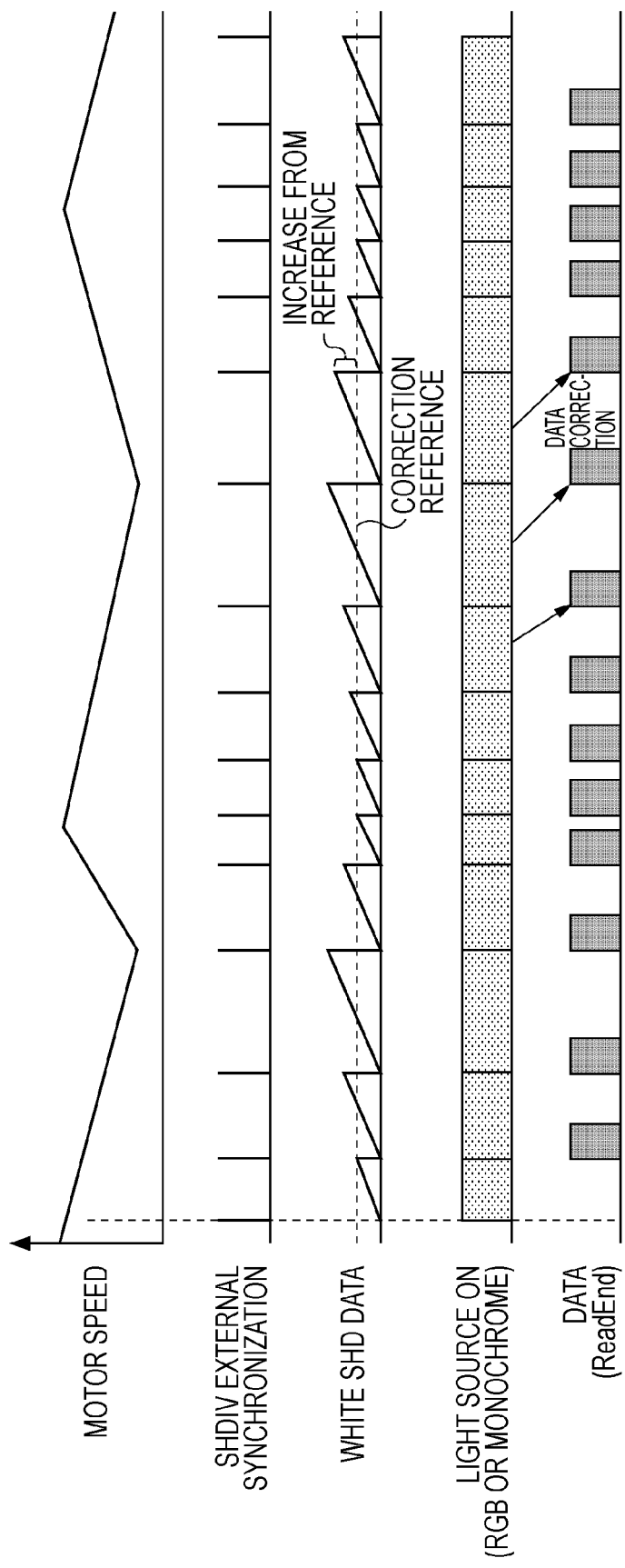
FIG. 4 illustrates a read synchronizing signal and increases in white shading data with respect to changes in motor speed.

FIG. 4 illustrates a read synchronizing signal and increases in white shading data with respect to changes in motor speed.

In FIG. 4, again, a motor speed may be changed by servo control of the DC motor. Changes in motor speed cause changes in timing of line-by-line generation of SHDIV generated on the basis of pulses output from the encoder. When minimum data accumulation time is represented by Typ (=Tmin), the level of white shading data at this point is a correction reference level indicated by a dotted line in FIG. 4. FIG. 4 illustrates some cases where the lighting interval of the light source increases, that is, where the reference data accumulation time Typ is exceeded. An increase in data accumulation time causes an increase in the amount of white shading data exceeding the correction reference level. This increase from the correction reference level represents white level data to be corrected. The data correction is performed while the white level data to be corrected is being reflected in correction shading data at the next synchronization timing of lighting-up of the light source.

Hereinafter, black and white shading data correction for each light receiving pixel will be described.

Figure 5:
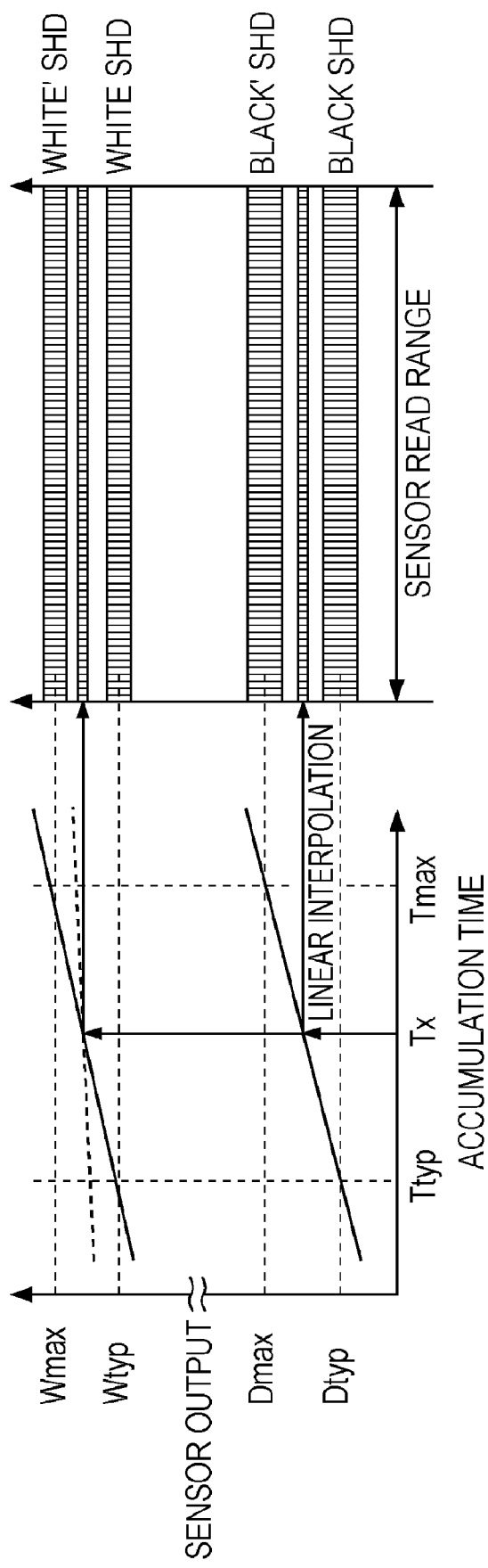
FIG. 5 illustrates accumulation time of an image sensor and pixel-by-pixel linear interpolation of black and white shading data according to a first embodiment of the present invention.

FIG. 5 illustrates a relationship between data accumulation time of the image sensor and linear interpolation of black and white shading data. In the right part of FIG. 5, the horizontal axis represents a sensor read range in the main scanning direction of the image sensor, while the vertical axis represents sensor output. Hatched areas corresponding to black SHD, black' SHD, white SHD, and white' SHD show that there are variations in shading data among light receiving pixels. Here, Ttyp represents minimum or reference data accumulation time necessary for photoelectric conversion, Wtyp represents white shading data corresponding to Ttyp, and Dtyp represents black shading data corresponding to Ttyp. Additionally, Tmax represents maximum data accumulation time, Wmax represents white shading data corresponding to Tmax, and Dmax represents black shading data corresponding to Tmax.

The graph on the left side of FIG. 5 shows data accumulation time Ttyp and Tmax and the corresponding shading data Dtyp, Dmax, Wtyp, and Wmax. This graph further shows determination of shading data corresponding to any accumulation time Tx using a linear function on the basis of the values of Dtyp, Dmax, Wtyp, and Wmax. The right part of FIG. 5 illustrates the output of the image sensor in the entire read range of the image sensor. As illustrated, the output characteristics vary among light receiving pixels of the image sensor. Therefore, even if the same accumulation time is set for each sensor, generated dark current (black shading data) varies among light receiving pixels. In the present embodiment, shading data is obtained and corrected with respect to each light receiving pixel.

As described above, Dtyp and Wtyp represent black shading data and white shading data, respectively, corresponding to the data accumulation time Tx of the image sensor. These shading data values are obtained by a number corresponding to the resolution according to the reading mode and stored in the internal or external memory. These shading data values may be stored in a compressed format. Next, as the data accumulation time Tmax, accumulation time that is equal to or greater than a maximum value of accumulation time that varies according to changes in motor speed is set. Shading data values corresponding to the plurality of accumulation time points are obtained by activating the internal timer or an external synchronizing signal. The black shading data Dmax and white shading data Wmax corresponding to the maximum data accumulation time Tmax are obtained by a number (x) of effective pixels of resolution corresponding to the reading mode. Thus, shading data values corresponding to the two different accumulation time points (Ttyp and Tmax) are obtained.

The accumulation time Tx shown in FIG. 5 indicates any accumulation time during driving of the DC motor in an actual reading operation. A procedure for correcting shading data at the accumulation time Tx on the basis of the obtained shading data values corresponding to the two different accumulation time points will be described below:

(1) Black shading data Dtyp (x) at the accumulation time Ttyp is stored in the memory.
(2) White shading data Wtyp (x) at the accumulation time Ttyp is stored in the memory.
(3) Black shading data Dmax (x) at the accumulation time Tmax is stored in the memory.
(4) White shading data Wmax (x) at the accumulation time Tmax is stored in the memory.
(5) Black shading data D'(x) corresponding to any accumulation time Tx is determined using the following function:

$$D'(x)=Dtyp(x)+(Dmax(x)-Dtyp(x))\times(Tx-Ttyp)/(Tmax-Ttyp)$$

Thus, black shading data corresponding to any accumulation time Tx and corrected with the linear function derived from the values of Dtyp(x), Dmax(x), Tmax, and Ttyp can be determined. Then, with D'(x) determined as described above, a black shading data correction is performed on all effective pixels on a pixel-by-pixel basis.
(6) Likewise, white shading data W'(x) corresponding to any accumulation time Tx is determined using the following function:

$$W'(x)=Wtyp(x)+(Wmax(x)-Wtyp(x))\times(Tx-Ttyp)/(Tmax-Ttyp)$$

Thus, by using the linear function derived from the values of Wtyp(x), Wmax(x), Tmax, and Ttyp, corrected shading data can be determined. Then, with W'(x) determined as described above, a white shading data correction is performed on all effective pixels on a pixel-by-pixel basis.

By using the shading data D' determined by the above-described equation of linear interpolation, a pixel-by-pixel correction is performed. An image read signal output Vout obtained after the pixel-by-pixel correction can be expressed as follows:

$$Vout=Const*(Vin-D')/(W'-D')+Offset$$

where Vin represents an input signal of read image data, Const represents a correction coefficient, and Offset represents a value for fine adjustment.

An operation circuit for (5) and (6) can be realized by a firmware configuration, a hardware configuration, or a combination of both. If shading data is stored in the memory in a compressed data format, the correction computation is performed while the compressed data is sequentially being decoded.

Moreover, although the shading data correction is performed on all effective pixels, a normal shading correction is simultaneously performed in practice by using black and white, black, or white correction data corrected pixel-by-pixel.

If linearity of the data correction is limited to any accumulation time interval, the above-described processing is performed in a plurality of accumulation time intervals. Specifically, the accumulation time Ttyp is set to Tn−1 and the accumulation time Tmax is set to Tn. Then, any accumulation time Tx is set between stored data values of two accumulation time points, and a means for determining the accumulation time Tx is provided.

If linearity is effective only for black shading data, linear interpolation may be done by performing only the above-described steps (1), (3), and (5) for the black shading data. In this case, a correction only on dark current of the image sensor is made possible. Similarly, if linearity is effective only for white shading data, only the above-described steps (2), (4), and (6) for the white shading data may be performed.

As described above, black and white shading data values corresponding to two different accumulation time points are obtained for each light receiving pixel. Then, corrected black and white shading data values corresponding to any accumulation time are determined with linear functions. By performing linear interpolation, data accumulation time of the image sensor corresponding to changes in motor speed can be taken into account. By using shading data corresponding to changes in data accumulation time, read image data can be corrected properly.

Figure 6:
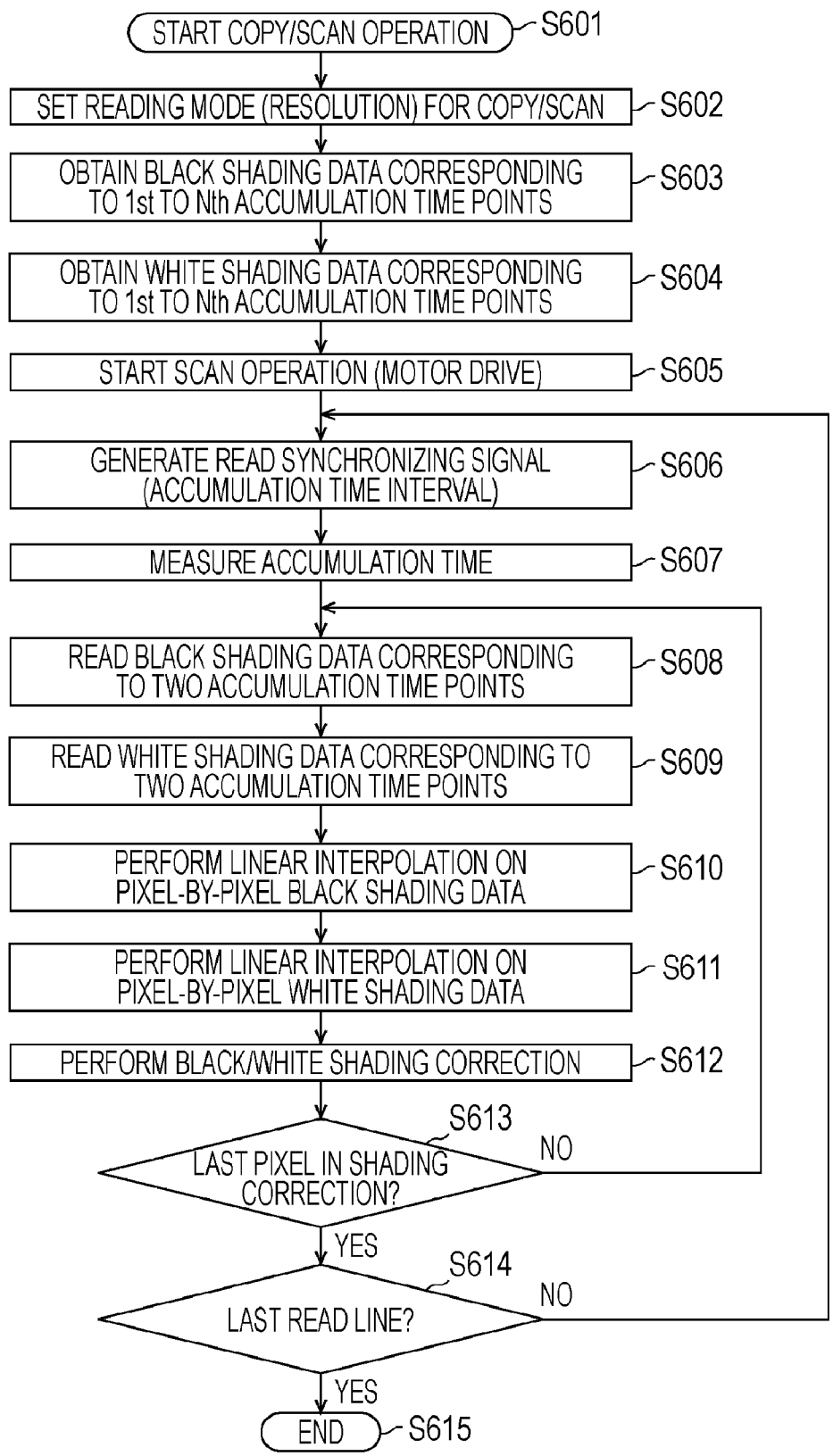
FIG. 6 is a flowchart illustrating a process of black and white shading data correction according to the first embodiment of the present invention.

FIG. 6 is a flowchart illustrating a pixel-by-pixel correction of black and white shading data performed using linear interpolation according to the first embodiment of the present invention.

In step S601, a copy/scan operation is started by operating an operation key of the image reading apparatus. In step S602, a reading mode (resolution) for the copy/scan operation is set. In step S603, black shading data values corresponding to first and second accumulation time points (Ttyp and Tmax) are obtained. Step S603 of FIG. 6 illustrates the case where shading data values corresponding to two or more accumulation time points are needed. That is, in step S603, black shading data values corresponding to the first to N-th accumulation time points are obtained. For example, shading data values corresponding to respective accumulation time points T1 to Tn (T1<T2<T3<...<Tn) are obtained.

In step S604, as in the case of black shading, a plurality of white shading data values are obtained. In step S605, a DC motor drive operation in the scan operation starts. Upon start of the motor drive operation, from an output signal of encoder pulses as illustrated in FIG. 2, a read synchronizing signal is generated in step S606 on the basis of the predetermined number of pulses. The read synchronizing signal corresponds to a data accumulation time period of the image sensor. Then, a drive signal for the image sensor and the inputting of read image data to the image sensor start. The read synchronizing signal is measured line-by-line and the accumulation time is stored in an internal register or memory in step S607. In the case of a CIS, the read synchronizing signal is measured with respect to each monochrome line of an LED or the like and the accumulation time is stored in the internal register or memory.

In step S608, a setting is made such that black shading data values corresponding to the first and second accumulation time points are read from the memory. Here, black shading data values corresponding to two accumulation time points are read pixel-by-pixel. If more than two shading data values are needed, a temporal position of the accumulation time Tx between Ttyp and Tmax is determined. A setting is made such that black shading data values corresponding to accumulation time points before and after the determined temporal position are read from the memory. Then, on a pixel-by-pixel basis, the set two black shading data values are read. In step S609, an operation basically the same as that of step S608 is performed for white shading data values. In step S610, according to the procedure of shading data correction described with reference to FIG. 5, pixel-by-pixel black shading data values are linearly interpolated.

In step S611, white shading data values are linearly interpolated in the same manner as that of step S610. In step S612, by using the black and white, black, or white shading data values corrected by linear interpolation, a shading correction is performed as follows:

$$Vout=Const*(Vin-D')/(W'D')+Offset$$

where Vout represents output data, Vin represents input data, Const represents a correction coefficient, Offset represents a value for fine adjustment, D' represents black shading data obtained after correction, and W' represents white shading data obtained after correction.

In step S613, it is determined whether the current pixel is the last pixel in the shading correction for one line. If the current pixel is not the last one (No in step S613), the process returns to step S608 and the correction of the next pixel is performed. If it is determined that the current pixel is the last one (Yes in step S613), the process proceeds to step S614, where it is further determined whether the current read line is the last one. If it is determined that the current read line is not the last one (No in step S614), the process returns to step S606. Then, generation of a read synchronizing signal and measurement of accumulation time are performed for the next line. If it is determined that the current read line is the last one (Yes in step S614), the copy/scan operation ends in step S615.

The processing flow illustrated in FIG. 6 may be performed either on black shading data only or white shading data only.

Second Embodiment

In a second embodiment of the present invention, black and white shading data values for individual light receiving pixels are obtained, and average values of the obtained shading data values are used to correct shading data.

Figure 7:
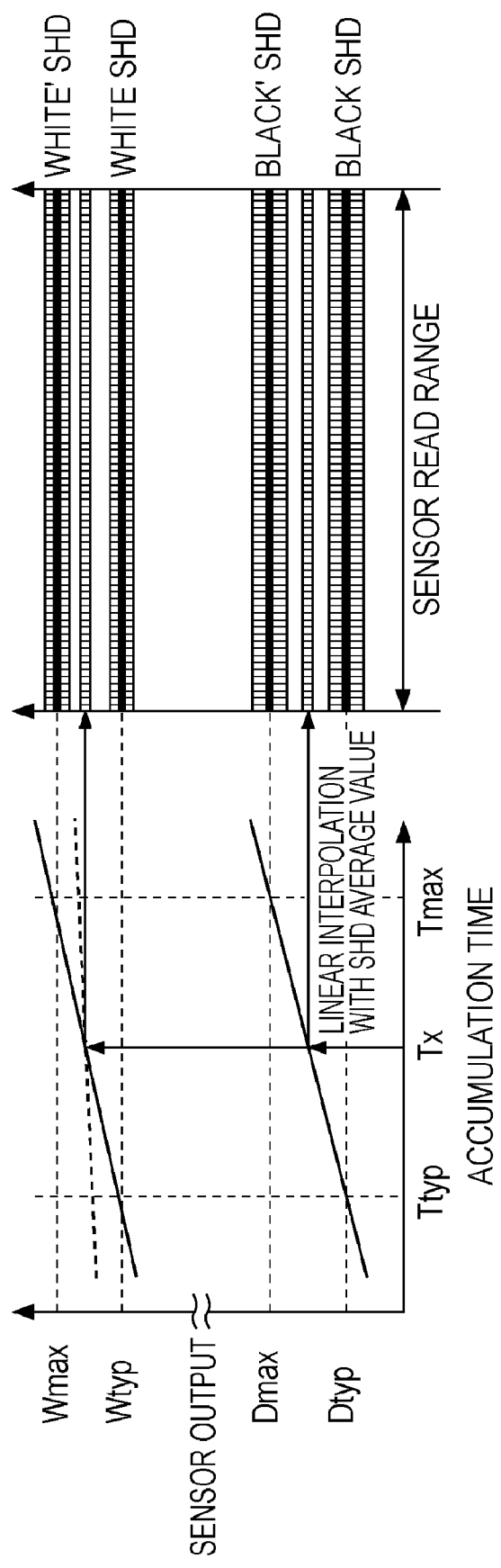
FIG. 7 illustrates linear interpolation using average values according to a second embodiment of the present invention.

FIG. 7 illustrates a relationship between data accumulation time of the image sensor and linear interpolation using average values of black and white shading data values. In the right part of FIG. 7, the horizontal axis represents a sensor read range in the main scanning direction of the image sensor, while the vertical axis represents sensor output. Hatched areas corresponding to black SHD average, black' SHD average, white SHD average, and white' SHD average show that there are variations in shading data among light receiving pixels. A black line in each hatched area represents an average value in the range of variations of data values.

Here, Ttyp represents minimum or reference data accumulation time necessary for photoelectric conversion, Wtyp represents white shading data corresponding to Ttyp, and Dtyp represents black shading data corresponding to Ttyp. Additionally, Tmax represents maximum data accumulation time, Wmax represents white shading data corresponding to Tmax, and Dmax represents black shading data corresponding to Tmax. The graph on the left side of FIG. 7 shows data accumulation time Ttyp and Tmax and the corresponding shading data Dtyp, Dmax, Wtyp, and Wmax. A linear function is derived from each shading data. By using the linear function derived, shading data corresponding to any accumulation time Tx is determined.

In the present embodiment, instead of applying a correction to each light receiving pixel, an average value of shading data that varies among light receiving pixels is used to perform linear interpolation. This makes it possible to reduce the load of data processing and the amount of memory used. The black shading data Dtyp and white shading data Wtyp corresponding to the minimum or reference data accumulation time Ttyp are obtained for each resolution corresponding to the reading mode. Each shading data obtained may be stored in the internal or external memory in a compressed format. As the accumulation time Tmax, accumulation time that is equal to or greater than a maximum value of accumulation time that varies according to changes in motor speed is set. Shading data values corresponding to the plurality of accumulation time points are obtained by activating the internal timer or an external synchronizing signal. The black shading data Dmax and white shading data Wmax corresponding to the accumulation time Tmax are obtained by a number (x) of effective pixels with respect to each resolution corresponding to the reading mode. While each shading data is being obtained, the average data is determined and stored. Alternatively, while each shading data is being obtained, a sum of the obtained shading data values is stored and the average value is determined.

The accumulation time Tx indicates any accumulation time during driving of the DC motor. A procedure of correction using an average value of obtained shading data values will be described below:

(1) Black shading data Dtyp (x) at the accumulation time Ttyp is stored in the memory. Additionally, average data of Dtyp (x) in the entire sensor read range is stored in the memory or register.
(2) White shading data Wtyp (x) at the accumulation time Ttyp is stored in the memory. Additionally, average data of Wtyp (x) in the entire sensor read range is stored in the memory or register.
(3) Average data Dmax_ave of black shading data Dmax (x) at the accumulation time Tmax is stored in the memory or register. Dmax_ave represents a value obtained by averaging black shading data values of individual light receiving pixels corresponding to the data accumulation time Tmax of the image sensor.
(4) Average data Wmax_ave of white shading data Wmax (x) at the accumulation time Tmax is stored in the memory or register. Wmax_ave represents a value obtained by averaging white shading data values of individual light receiving pixels corresponding to the data accumulation time Tmax of the image sensor.
(5) A function for determining black shading data D'(x) corresponding to any accumulation time Tx is expressed by the following equation:

$$D'(x)=D\text{typ}(x)+(D\text{max\_ave}-D\text{typ\_ave})\times(Tx-T\text{typ})/(T\text{max}-T\text{typ})$$

Thus, with the linear function derived from the values of Dtyp(x), Dmax_ave, Tmax, and Ttyp, corrected black shading data is determined. Then, with D'(x) determined as described above, a black shading data correction is performed on all effective pixels. That is, the correction is performed on all effective pixels uniformly by using the average value.

(6) A function for determining white shading data W'(x) corresponding to any accumulation time Tx is expressed by the following equation:

$$W'(x)=W\text{typ}(x)+(W\text{max\_ave}-W\text{typ\_ave})\times(Tx-T\text{typ})/(T\text{max}-T\text{typ})$$

Thus, with the linear function derived from the values of Wtyp(x), Wmax_ave, Tmax, and Ttyp, corrected white shading data is determined. Then, with W'(x) determined as described above, a white shading data correction is performed on all effective pixels. That is, the correction is performed on all effective pixels uniformly by using the average value.

An operation circuit for (5) and (6) can be realized by a firmware configuration, a hardware configuration, or a combination of both. If the shading data is stored in the memory in a compressed data format, the correction computation is performed while the compressed data is sequentially being decoded.

Moreover, although the shading data correction is performed on all effective pixels, a normal shading correction is simultaneously performed in practice by using black and white, black, or white correction data corrected pixel-by-pixel.

If linearity of the data correction is established only in any accumulation time interval, the above-described processing may be performed only in the accumulation time interval where linearity is established. The above-described processing may be performed in a plurality of accumulation time intervals where linearity is established.

When the accumulation time Ttyp is set to Tn−1 and the accumulation time Tmax is set to Tn, if there is a means for determining only that the accumulation time Tx is between stored data values of the two accumulation time points, it is possible to determine that linearity is established.

In the above-described configuration where average data is used, input data from the reading device may be used without making any modification thereto. This is advantageous in that, as long as a data processing circuit is added before shading, there is no need to modify a circuit block where shading processing is performed.

The data correction may be done by performing only the steps (1), (3), and (5) for the black shading data. In this case, the amount of correction according to accumulation time, i.e., Ddc=(Dmax_ave−Dtyp_ave)×(Tx−Ttyp)/(Tmax−Ttyp), indicated on the right side of the equation in (5) is subtracted from the input data Vin. A black shading correction appropriate for the accumulation time can thus be realized by the following calculation:

$$V\text{out} = \text{Const} * \{(V\text{in} - D\text{dc}) - D\text{typ}\}/(W\text{typ} - D\text{typ}) + \text{Offset}$$

where Vout represents an image read signal output after the correction, Vin represents an input signal of read image data, Const represents a correction coefficient, and Offset represents a value for fine adjustment.

The data correction may be done by performing only the steps (2), (4), and (6) for the white shading data. In this case, the amount of correction according to accumulation time, i.e., Wdc=(Wmax_ave−Wtyp_ave)×(Tx−Ttyp)/(Tmax−Ttyp), indicated on the right side of the equation in (6) is subtracted from the input data Vin. A white shading correction appropriate for the accumulation time can thus be realized by the following calculation:

$$V\text{out} = \text{Const} * \{(V\text{in} - W\text{dc}) - D\text{typ}\}/(W\text{typ} - D\text{typ}) + \text{Offset}$$

As described above, an average value of black and white shading data corresponding to two different points of accumulation time of the image sensor is obtained. Then, corrected black and white shading data corresponding to any accumulation time is determined by linear functions. Thus, by using shading data corresponding to accumulation time of the image sensor, read image data can be corrected properly according to changes in motor speed.

Figure 8:
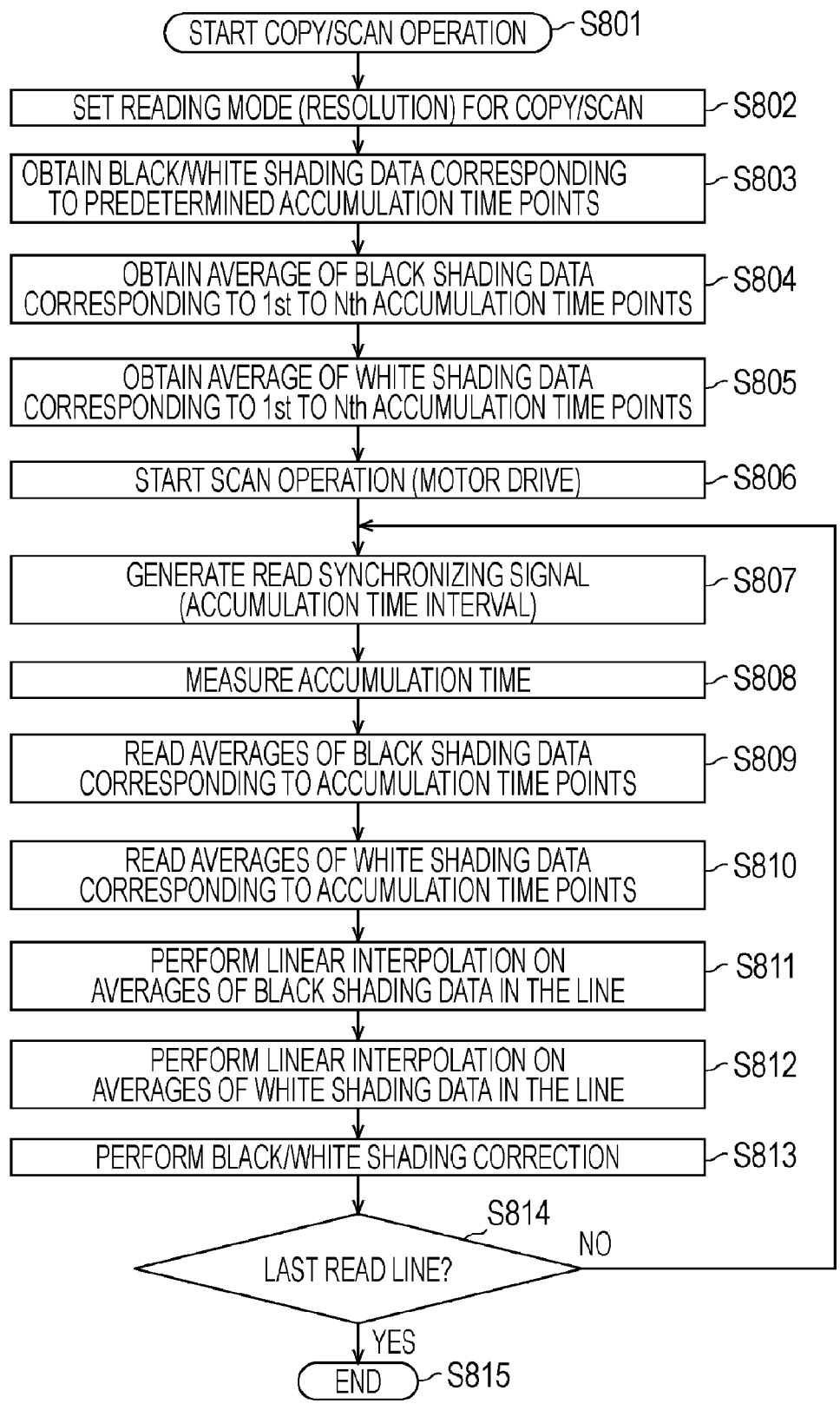
FIG. 8 is a flowchart illustrating a process of black and white shading data correction according to the second embodiment of the present invention.

FIG. 8 is a flowchart illustrating a data correction with linear interpolation using an average value of shading data according to the second embodiment of the present invention.

In step S801, a copy/scan operation is started by operating the operation key of the image reading apparatus. In step S802, a reading mode (resolution) for the copy/scan operation is set. In step S803, black and white, black, or white shading data values corresponding to first and second accumulation time points (Ttyp and Tmax) are obtained. In the present embodiment, the first accumulation time point Ttyp is used as the reference. In step S804, an average value of the black shading data values corresponding to the first and second accumulation time points is obtained. Step S804 of FIG. 8 illustrates the case where shading data values corresponding to two or more accumulation time points are obtained. Then, an average value of black shading data values corresponding to the first to N-th accumulation time points is obtained. For example, an average value of shading data values corresponding to respective accumulation time points T1 to Tn (T1<T2<T3<...<Tn) is obtained. In step S805, an operation basically the same as that of step S804 is performed for white shading data values.

In step S806, a DC motor drive operation in the scan operation starts. Upon start of the motor drive operation, from an output signal of encoder pulses as illustrated in FIG. 2, a read synchronizing signal is generated in step S807 on the basis of the predetermined number of pulses. The read synchronizing signal corresponds to a data accumulation time period of the image sensor. Then, a drive signal for the image sensor and the inputting of read image data to the image sensor start. The read synchronizing signal is measured line-by-line and the accumulation time is stored in an internal register or memory in step S808. In the case of a CIS, the read synchronizing signal is measured with respect to each monochrome line of an LED or the like and the accumulation time is stored in the internal register or memory. In step S809, a setting is made such that an average value of black shading data values corresponding to the first and second accumulation time points is read from the register or memory. In step S809 of FIG. 8, black shading data values corresponding to the two accumulation time points are read pixel-by-pixel. If more than two shading data values are needed, a temporal position of the accumulation time point Tx between Ttyp and Tmax is determined. A setting is made such that an average value of black shading data values corresponding to accumulation time points before and after the determined temporal position (two accumulation time points) is read from the register or memory.

Then, an average value of the black shading data values corresponding to the set two accumulation time points and a black shading data value corresponding to the first accumulation time point Ttyp are read pixel-by-pixel. In the present embodiment, Ttyp represents reference accumulation time. In step S810, an operation basically the same as that of step S809 is performed for an average value of white shading data values. In step S811, according to the procedure of shading data correction described with reference to FIG. 6, linear interpolation is performed on average values of black shading data values for one line. In step S812, linear interpolation is performed also on average values of white shading data values. Then, in step S813, by using corrected average values of black and white, black, or white shading data values, a shading correction basically the same as that described in (1) to (6) of the first embodiment is performed. A correction value is obtained line-by-line and, on the basis of a reference average value of shading data values, a correction is performed on all effective pixels.

Then, in step S814, it is determined whether the current read line is the last one. If it is determined that the current read line is not the last one (No in step S814), the process returns to step S807. Then, generation of a read synchronizing signal and measurement of accumulation time are performed for the next line. If it is determined that the current read line is the last one (Yes in step S814), the copy/scan operation ends in step S815.

Third Embodiment

FIG. 9 is a flowchart illustrating a process of input data correction performed with line-by-line linear interpolation using an average value of shading data according to a third embodiment of the present invention.

In step S901, a copy/scan operation is started by operating the operation key of the image reading apparatus. In step S902, a reading mode (resolution) for the copy/scan operation is set. In step S903, black and white, black, or white shading data values corresponding to first and second accumulation time points (Ttyp and Tmax) are obtained. In the present embodiment, the first accumulation time point Ttyp is used as the reference. In step S904, an average value of the black shading data values corresponding to the two accumulation time points is obtained. In step S904 of FIG. 9, an average value of black shading data values corresponding to the first to N-th accumulation time points is obtained. For example, an average value of shading data values corresponding to respective accumulation time points T1 to Tn (T1<T2<T3<...<Tn) is obtained. In step S905, an average value of white shading data values is obtained in the same manner as that of step S904.

In step S906, a DC motor drive operation in the scan operation starts. Upon start of the motor drive operation, from an output signal of encoder pulses as illustrated in FIG. 2, a read synchronizing signal is generated in step S907. The read synchronizing signal corresponds to a data accumulation time period of the image sensor. Then, a drive signal for the image sensor and the inputting of read image data to the image sensor start. The read synchronizing signal is measured line-by-line and the accumulation time is stored in an internal register or memory in step S908. In the case of a CIS, the read synchronizing signal is measured with respect to each monochrome line of an LED or the like and the accumulation time is stored in the internal register or memory.

In step S909, a setting is made such that an average value of black shading data values corresponding to the first and second accumulation time points can be read from the register or memory. In step S909 of FIG. 9, black shading data values are read pixel-by-pixel. If black shading data values corresponding to more than two accumulation time points are needed, a temporal position of the accumulation time point Tx between Ttyp and Tmax is determined. A setting is made such that an average value of black shading data values corresponding to accumulation time points before and after the determined temporal position (two accumulation time points) is read from the register or memory. Then, an average value of the black shading data values corresponding to the set two accumulation time points and a black shading data value corresponding to the first accumulation time point Ttyp are read pixel-by-pixel. In step S910, a setting for an average value of white shading data values is made in the same manner as that of step S909.

In step S911, according to the procedure of shading data correction described with reference to FIG. 6, linear interpolation is performed on average values of black shading data values for one line. Additionally, input data for the line is corrected. In step S912, an operation basically the same as that of step S911 is performed on average values of white shading data values. Then, in step S913, the shading correction described in (1) to (6) of the first embodiment is performed. In step S914, it is determined whether the current read line is the last one. If it is determined that the current read line is not the last one (No in step S914), the process returns to step S907. Then, generation of a read synchronizing signal and measurement of accumulation time are performed for the next line. If it is determined that the current read line is the last one (Yes in step S914), the copy/scan operation ends in step S915.

As described, in the present invention, for black and white level data, shading correction methods are selected or combined as necessary on a pixel-by-pixel or line-by-line basis. Thus, in an image reading operation performed by the image sensor in synchronization with pulses output from the encoder of the DC motor, a dark current component of the image sensor at any accumulation time can be corrected optimally according to changes in motor speed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-258886 filed Oct. 2, 2007, which is hereby incorporated by reference herein in its entirety.

What is claimed is:

1. An image reading apparatus for reading a document by causing an image sensor having a plurality of light receiving pixels to scan the document, the apparatus comprising:
    an encoder configured to output pulses according to rotation of a motor;
    a generating unit configured to generate a read synchronizing signal for the image sensor based on the pulses;
    an obtaining unit configured to obtain first shading data corresponding to at least two data accumulation time from the image sensor; and
    a storage unit configured to store the first shading data,
    wherein a function for determining second shading data corresponding to a read data accumulation time set on the basis of the read synchronizing signal is generated on the basis of the first shading data.

2. The image reading apparatus according to claim 1, wherein the read data accumulation time is between the at least two data accumulation time corresponding to the first shading data.

3. The image reading apparatus according to claim 1, wherein the first shading data is obtained with respect to each of the plurality of light receiving pixels.

4. The image reading apparatus according to claim 1, wherein the first shading data is an average value of a plurality of shading data values obtained for each of the plurality of light receiving pixels.

5. The image reading apparatus according to claim 1, wherein the function is a linear function.

6. The image reading apparatus according to claim 1, further comprising a correcting unit configured to correct read data on the basis of the second shading data.

7. The image reading apparatus according to claim 1, wherein the first shading data is data based on a dark current of the image sensor.

8. The image reading apparatus according to claim 1, wherein the first shading data is black shading data.

9. The image reading apparatus according to claim 1, wherein the motor is a direct current motor.

10. An image reading method for reading a document by allowing a direct current motor to cause an image sensor having a plurality of light receiving pixels to scan the document, the method comprising:
    outputting pulses responsive to rotation of the direct current motor;
    generating a read synchronizing signal on the basis of the pulses;
    obtaining first shading data corresponding to at least two data accumulation time from the image sensor; and
    generating, based on the first shading data, a function for determining second shading data corresponding to an accumulation time set on the basis of the read synchronizing signal.

* * * * *